(12) United States Patent
Tsuchiya et al.

(10) Patent No.: US 7,503,991 B2
(45) Date of Patent: Mar. 17, 2009

(54) FILM LAMINATION METHOD AND LAMINATION-APPARATUS

(75) Inventors: Katsunori Tsuchiya, Hitachi (JP); Kyouko Ozawa, Hitachi (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/498,065

(22) PCT Filed: Dec. 10, 2002

(86) PCT No.: PCT/JP02/12888

§ 371 (c)(1),
(2), (4) Date: Jun. 9, 2004

(87) PCT Pub. No.: WO03/049925

PCT Pub. Date: Jun. 19, 2003

(65) Prior Publication Data

US 2005/0028916 A1    Feb. 10, 2005

(30) Foreign Application Priority Data

Dec. 10, 2001  (JP) .............................. 2001-376224

(51) Int. Cl.
    *B32B 37/00*  (2006.01)
(52) U.S. Cl. .................... 156/73.1; 156/308.2; 428/141
(58) Field of Classification Search ................ 156/73.1, 156/73.6, 580.1, 580.2, 308.2, 308.4; 228/110.1, 228/180.5, 1.1, 4.5; 428/98, 141
    See application file for complete search history.

(56) References Cited

U.S. PATENT DOCUMENTS

| | | | |
|---|---|---|---|
| 4,400,227 A | 8/1983 | Riemersma | |
| 5,354,392 A * | 10/1994 | Santo et al. | 156/73.1 |
| 5,888,650 A * | 3/1999 | Calhoun et al. | 428/354 |
| 6,060,215 A * | 5/2000 | Amanokura et al. | 430/281.1 |
| 6,202,915 B1 * | 3/2001 | Sato | 228/110.1 |
| 6,523,734 B1 * | 2/2003 | Kawai et al. | 228/110.1 |
| 6,564,988 B1 * | 5/2003 | Shiraishi et al. | 228/110.1 |
| 6,583,364 B1 * | 6/2003 | Kurita et al. | 174/254 |
| 6,645,331 B2 * | 11/2003 | Northey | 156/73.1 |
| 2004/0112532 A1 * | 6/2004 | Yandrasits et al. | 156/308.4 |

FOREIGN PATENT DOCUMENTS

| | | |
|---|---|---|
| JP | 55-148486 A | 11/1980 |
| JP | 62-60645 A | 3/1987 |
| JP | 62-12579 Y2 | 4/1987 |
| JP | 3-49867 Y2 | 10/1991 |
| JP | 4-371827 A | 12/1992 |
| JP | 7-9564 A | 1/1995 |
| JP | 2001-334575 A | 12/2001 |

OTHER PUBLICATIONS

International Search Report, completed Mar. 10, 2003.

\* cited by examiner

*Primary Examiner*—James Sells
(74) *Attorney, Agent, or Firm*—Griffin & Szipl, P.C.

(57) ABSTRACT

In a film lamination method of the present invention, sound waves with a predetermined frequency are applied to at least one of a substrate or a film disposed on the substrate. Thus, by means of an acoustic vibration energy action, the adhesion of the film to the substrate and the quality of covering irregularities can be sufficiently enhanced and the embedding quality of the film to the irregular portions of the substrate can be achieved to a high standard.

9 Claims, 14 Drawing Sheets

FILM LAMINATION METHOD AND LAMINATION-APPARATUS

This is a National Phase Application in the United States of International Patent Application No. PCT/JP02/12888 filed Dec. 10, 2002, which claims priority on Japanese Patent Application No. P2001-376224 filed Dec. 10, 2001. The entire disclosures of the above patent applications are hereby incorporated by reference.

TECHNICAL FIELD

The present invention relates to a method for laminating a film-form composition onto a substrate and a lamination apparatus.

BACKGROUND ART

A method in which a substrate and a film are bonded together by being pressurized in the direction of thickness under heat is known in the prior art as a method of laminating a resist film onto a printed board. According to this method, the adhesion of the film to the substrate is enhanced due to pressurization and a reduction in the viscosity of the film caused by heating, and the quality of covering irregularities is enhanced such that air bubbles are not introduced between the substrate and film when irregularities on the substrate are covered.

However, the heating conditions in this method are limited depending on the substrate and film substances, and thus in cases when enough heat cannot be applied to sufficiently reduce the viscosity of the film, it is difficult to obtain a sufficient degree of lamination efficiency. Particularly when a film contains an active substance, limitations upon the heating temperature and heating time period are severe, as a result of which adhesion of the film to the substrate and quality of covering irregularity on the substrate tend to be insufficient. Further, during actual operations the substrate or lamination apparatus must be preheated to a predetermined temperature in order to attain the aforementioned heating effect, and as a result the deterioration of substrate or film may occur.

Hence, in order to solve these problems, a lamination method and apparatus in which the film does not necessarily have to be heated has been investigated. For example, Japanese Patent Application Laid-Open No. S55-148486 discloses a film lamination apparatus in which a pressurizing device is caused to oscillate along the direction of lamination between the substrate and film. Japanese Patent Application Laid-Open No. S62-60645 discloses a lamination apparatus in which air enclosed between the substrate and film is removed by causing a lamination roller to oscillate by means of an electromagnetic vibrator or the like.

DISCLOSURE OF THE INVENTION

Even according to these conventional lamination apparatus, however, it is not always easy to achieve a high standard of adhesion and property of covering irregularity, and poor adhesion often occurs due to the film not entering the irregularities on the substrate.

The present invention has been designed in consideration of these problems in the prior art, and it is an object thereof to provide a film lamination method and a lamination apparatus in which, when a substrate and film-form composition are laminated, adhesion and quality of covering irregularity are of a sufficiently high level, and embedding of the film into the irregularities on the substrate may be achieved to a high standard.

More specifically, the film lamination method of the present invention is one in which, upon lamination of a film on a substrate, sound waves with a predetermined frequency are applied to at least one of a substrate or a film.

In the film lamination method of the present invention, it is conjectured that, when the film is laminated on the substrate, the application of sound waves with a predetermined frequency to at least one of a substrate or a film may produce elastic deformation and plastic deformation are produced in the film and an interatomic bond, frictional heat and soon are produced between the substrate and the film by means of an acoustic vibration energy action with the result that the adhesion of the film to the substrate and the quality of covering irregularities can be sufficiently enhanced, and the embedding quality of the film into the irregular portions of the substrate can be achieved to a high standard.

In the film lamination method of the present invention, it is preferable that pressure is applied in the direction of thickness of the film disposed on the substrate and the sound waves with a predetermined frequency are also applied to at least one of the substrate or film. By performing pressurization and sound wave application simultaneously, the adhesion of the film to the substrate and the quality of covering irregularities can be further enhanced by means of a synergistic effect between the pressurization and an acoustic vibration energy action.

It is preferable that the film lamination of the present invention comprises a pressurization step in which the film is disposed on the substrate and pressure is applied in the direction of thickness; and a sound wave application step in which sound waves with a predetermined frequency are applied to at least one of the substrate or the film following the pressure application step. The synergistic effect between the pressurization and the acoustic vibration energy action is also obtained by performing the sound wave application step following the pressure application step, and thus the adhesion of the film to the substrate and the quality of covering irregularities can be further enhanced.

It is also preferable that the film lamination of the present invention comprises a sound wave application step in which the film is disposed on the substrate and sound waves with a predetermined frequency are applied to at least one of the substrate or the film; and a pressurization step in which pressure is applied in the direction of thickness following the sound wave application step. The synergistic effect between the pressurization and the acoustic vibration energy action is also obtained by performing the sound wave application step prior to the pressure application step, and thus the adhesion of the film to the substrate and the quality of covering irregularities can be further enhanced.

In the film lamination method of the present invention, it is preferable that the frequency of the sound waves is not less than 16 kHz. By using sound waves with a frequency of not less than 16 kHz, the adhesion of the film and the quality of covering irregularities can be further enhanced.

According to the film lamination method of the present invention, an embedding quality of a sufficiently high standard may also be achieved when the substrate comprises a conductive metal layer and the film comprises a layer consisting of a photosensitive resin composition or a thermosetting resin composition. Note that when a film which consists of a photosensitive resin composition is laminated on a substrate comprising a conductive metal layer conventionally, the adhesion and the quality of covering irregularities tend to be insufficient due to the limitations of the heating conditions and so on.

A film lamination apparatus of the present invention comprises a sound wave generating device for applying sound waves with a predetermined frequency to at least one of a substrate or a film disposed on the substrate. It is conjectured that, by means of an acoustic vibration energy action, elastic deformation and plastic deformation in the film and an interatomic bond, frictional heat and so on between the substrate and the film can be produced efficiently and securely with the result that lamination of the film onto the substrate can be performed with the adhesion and the quality of covering irregularities of a high standard.

It is preferable that the film lamination apparatus of the present invention further comprises a pressurizing device for applying pressure to the substrate and the film in the direction of thickness. By means of the pressurizing device and the sound wave generating device, a synergistic effect between the pressurization and the acoustic vibration energy action is obtained, with the result that the adhesion of the film to the substrate and the quality of covering irregularities can be further enhanced.

BEST MODES FOR CARRYING OUT THE INVENTION

Figure 1:
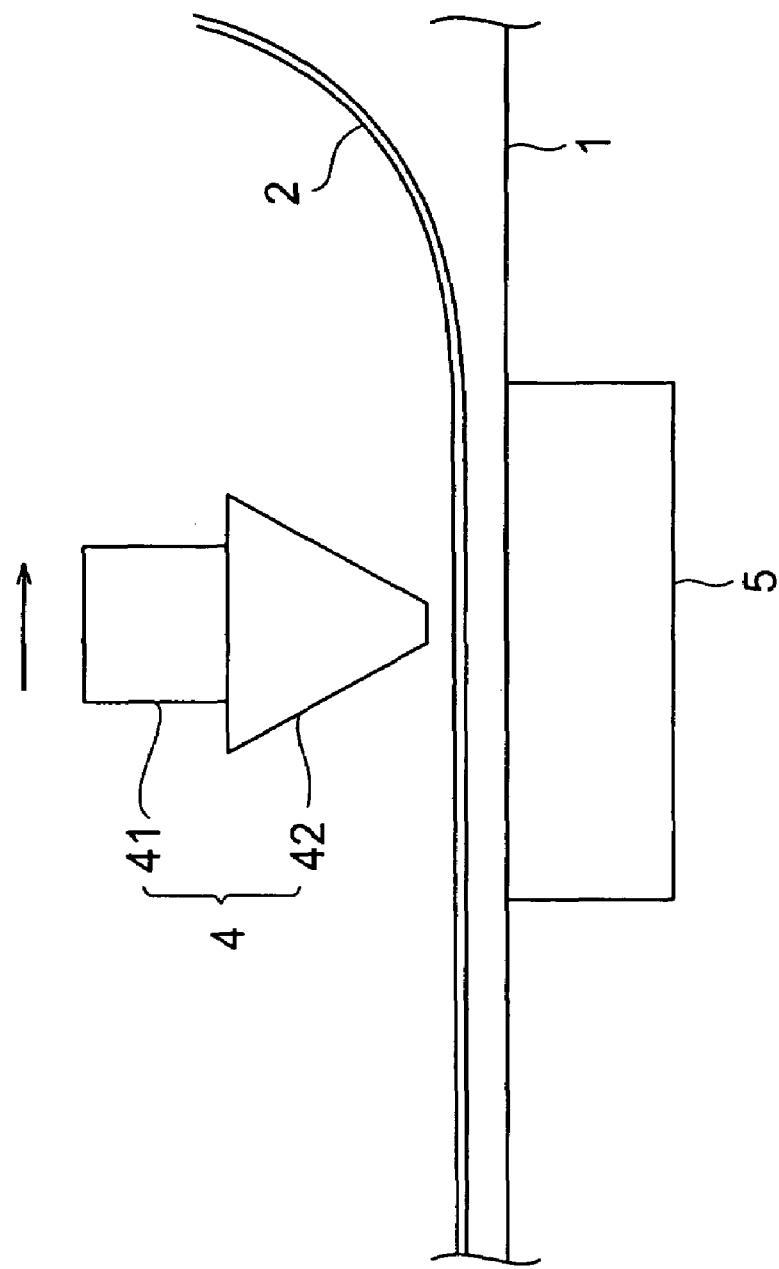
FIG. 1 is a schematic constitutional diagram illustrating a film lamination apparatus according to a first embodiment of the present invention.

Preferred embodiments of the present invention will now be described with reference to the drawings. Note that in the drawings, identical or corresponding parts have been allocated identical reference numerals and duplicate explanations have been omitted.

In the film lamination method and apparatus of the present invention, sound waves are applied to a substrate or a film, and by means of the action of the acoustic vibration energy thereof, the adhesion of the film to the substrate and the quality of covering irregularities are enhanced. Thus a sufficient degree of lamination efficiency can be achieved without heating the film and so on. Accordingly there are no particular limitations on the substrate and the film of the present invention as long as the adhesion of the film to the substrate and the quality of covering irregularities are enhanced by means of acoustic vibration energy action.

As the substrate, for example, a printed board comprising a conductive metal layer such as copper foil with irregularities formed in this conductive metal layer, or a glass substrate or the like may be used.

As the film, a film having a layer consisting of a photosensitive resin composition or a thermoplastic resin composition may be used. Even when a film which is limited in terms of heating conditions is used, such as a film consisting of a photosensitive resin composition blended with a photopolymerized compound or the like, lamination of this film onto the substrate can be performed favorably. As the resin, acryl resin, methyl-methacrylate styrene resin, styrene resin, epoxy resin, amide resin, amide-epoxy resin, alkyd resin, phenol resin, polyester resin, urethane resin, and so on may be cited. As the photopolymerized compound, for example, a compound having at least one intramolecular polymerizable ethylene unsaturated bond, or more specifically a compound obtained by reacting α,β-unsaturated carboxylic acid with polyhydric alcohol, a bisphenol (meth) acrylate compound, a (meth) acrylate compound with an intramolecular urethane bond, an alkyl ester (meth) acrylate, and so on may be cited.

FIG. 1 is a schematic constitutional diagram illustrating a film lamination apparatus according to a first embodiment of the present invention. The lamination apparatus illustrated in FIG. 1 comprises a sound wave generator 4 on the upper surface side of a support base 5 which supports a substrate 1 and a film 2. The sound wave generator 4 comprises an oscillator 41 for emitting sound waves with a predetermined frequency and a horn 42 for condensing the sound wave emitted from the oscillator 41 toward the film 2, and is capable of movement in a predetermined direction (for example in the direction of the arrow in the drawing) along the upper surface of the support base 5.

When the film 2 is to be laminated on the substrate 1 using the film lamination apparatus of the above constitution, film 2 is disposed on the substrate 1 in turn on the support base 5, whereupon the sound wave generator 4 applies sound waves with a predetermined frequency to the film 2 while moving along the upper surface of the support base 5. Thus, by means of an acoustic vibration energy action, the adhesion of the film 2 to the substrate and the quality of covering irregularities can be sufficiently enhanced.

The frequency of the sound waves used here in the present invention is preferably not less than 16 kHz, and more preferably not less than 20 kHz. If the frequency is below this lower limit, it becomes difficult to produce elastic deformation and plastic deformation in the film 2 and an interatomic bond, frictional heat and so on between the substrate 1 and the film 2, as a result of which the adhesion and the quality of covering irregularities tend to deteriorate. It is also preferable for the frequency of the sound waves to be not more than 1 GHz, more preferably not more than 10 MHz, and even more preferably not more than 300 kHz.

Figure 2:
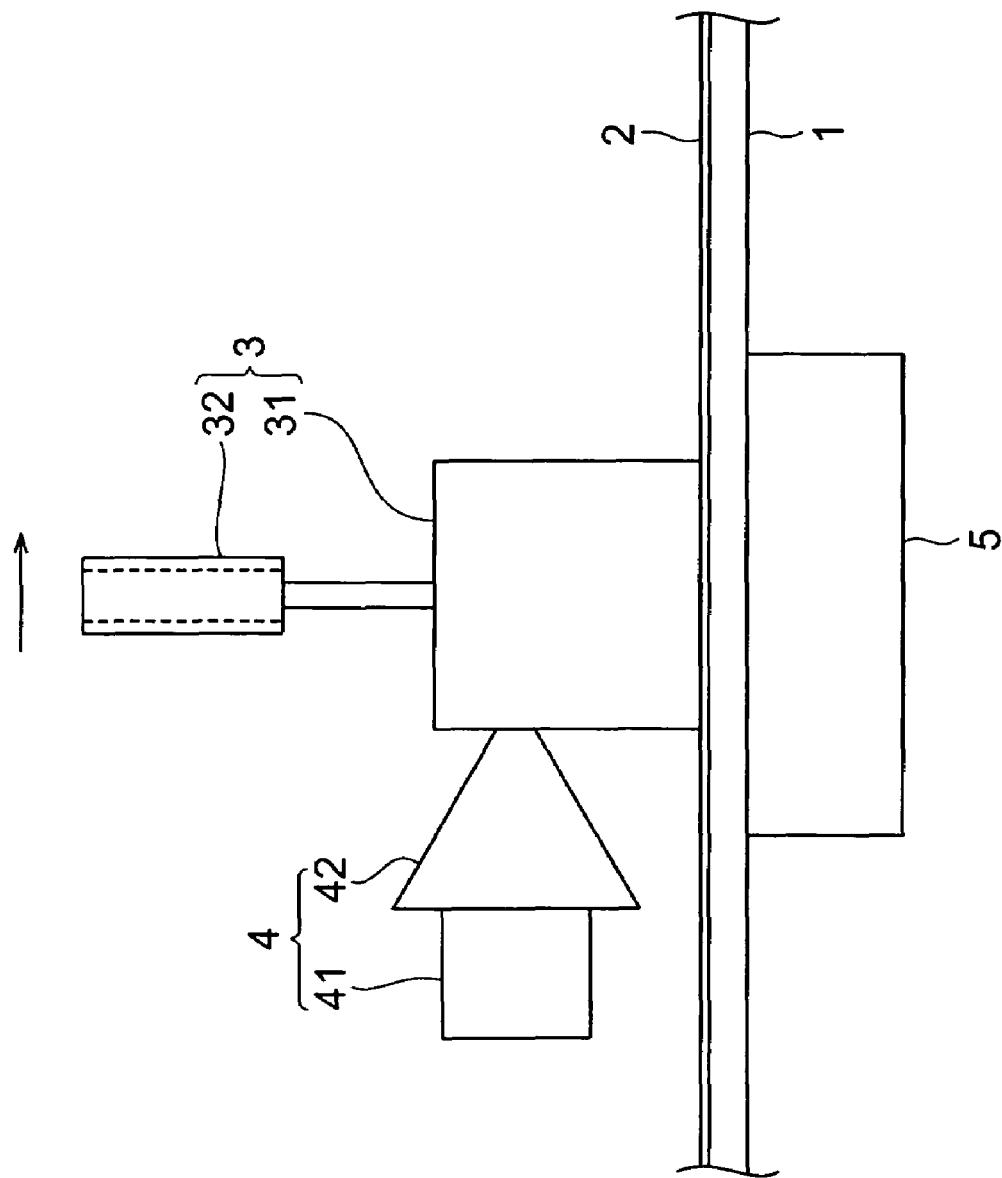
FIG. 2 is a schematic constitutional diagram illustrating a film lamination apparatus according to a second embodiment of the present invention.

FIG. 2 is a schematic constitutional diagram illustrating a film lamination apparatus according to a second embodiment of the present invention. In the apparatus illustrated in FIG. 2, a pressurization device 3 comprising a pressurizing member 31 and an air cylinder 32 is disposed on the upper surface side of a support base 5 which supports a substrate 1 and a film 2.

The pressurizing member 31 is movable in a perpendicular direction to the upper surface of the support base 5 by means of pressure from the air cylinder 32. Thus, when the substrate 1 and film 2 are to be pressurized in the direction of thickness, even when irregularities are formed on the substrate 1, pressure may be applied while maintaining a predetermined pressure along the corrugations of these irregularities.

Also in this apparatus, the sound wave generator 4 is disposed adjacent to the pressurization device 3. Sound waves generated by the oscillator 41 are applied to the pressurizing member 31 via the horn 42.

When the film 2 is to be laminated on the substrate 1 using the film lamination apparatus of the above constitution, the film 2 is disposed on the substrate 1 in turn on the support base 5, whereupon the pressurizing member 31 is pushed downward by the air cylinder 32. As a result, a predetermined pressure is applied to the substrate 1 and film 2 in the direction of thickness. Upon the application of this pressure, sound waves with a predetermined frequency, which are generated by the sound wave generator 4, are applied to the pressurizing member 31, whereby these sound waves are transmitted through the pressurizing member 31 to the film 2. As a result of the synergistic effect of the pressurization and the acoustic vibration energy action, the adhesion of the film 2 to the substrate 1 and the quality of covering irregularities can be sufficiently enhanced.

Further, by transmitting sound waves through the pressurizing member 31 to the film 2, these sound waves are efficiently and securely applied to the region of lamination between the substrate 1 and film 2 with which the pressurizing member 31 is in contact, and thus an extremely high standard of lamination efficiency can be achieved.

The pressure applied to the film 2 by the pressurization device 3 is preferably from 0.1 to 1 MPa. If the pressure is below the lower limit thereof, the adhesion of the film 2 to substrate 1 and the quality of covering irregularities tend to deteriorate even when sound waves are applied to the film 2 and so on. If the pressure exceeds the upper limit thereof, on the other hand, the load placed upon the substrate 1 becomes excessively large, leading to possible problems such as damage to the substrate 1.

Figure 3:
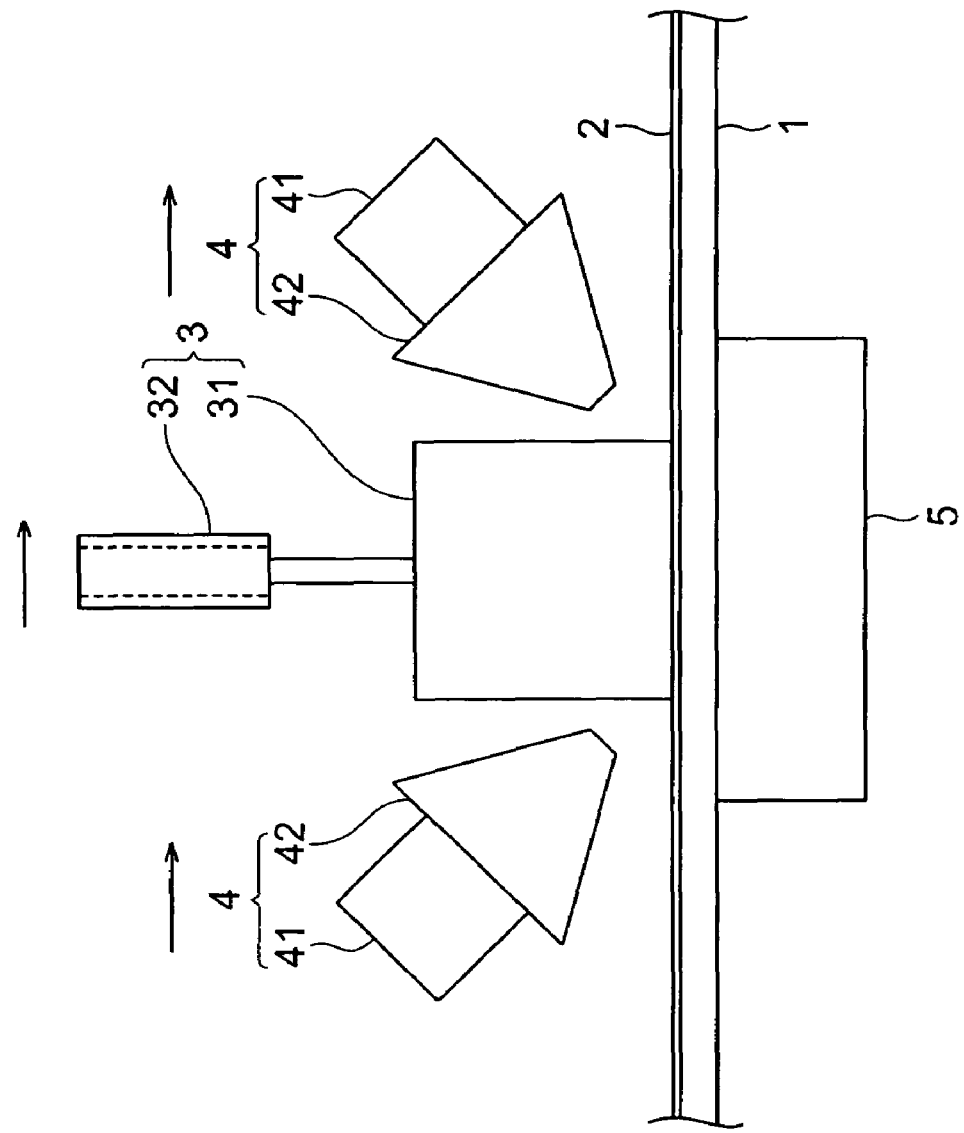
FIG. 3 is a schematic constitutional diagram illustrating a film lamination apparatus according to a third embodiment of the present invention.

FIG. 3 is a schematic constitutional diagram illustrating a film lamination apparatus according to a third embodiment of the present invention. In the apparatus illustrated in FIG. 3, two sound wave generators 4 are disposed such that horns 42 thereof face toward the lamination region between the pressurizing member 31 and the support base 5, and thus the sound waves from the sound wave generators 4 may be applied directly to the film 2.

The third embodiment differs from the apparatus illustrated in FIG. 2 merely in that sound waves from the sound wave generator 4 are applied directly to the film 2, and is identical to the second embodiment in the resulting obtained effect of enhanced the adhesion and the quality of covering irregularities between the substrate 1 and film 2 by the synergistic effect of the pressurization and the acoustic vibration energy action. Further, by directly applying sound waves to the film 2 bypassing the pressurizing member 31, damage to the shaft portion of the air cylinder 32 and so on can be reduced, thereby improving the longevity of the apparatus.

There are no particular limitations on the number of sound wave generators 4 as long as sufficient sound waves may be applied to the lamination regions between the substrate 1 and film 2, and one, or three or more, may be provided.

Figure 4:
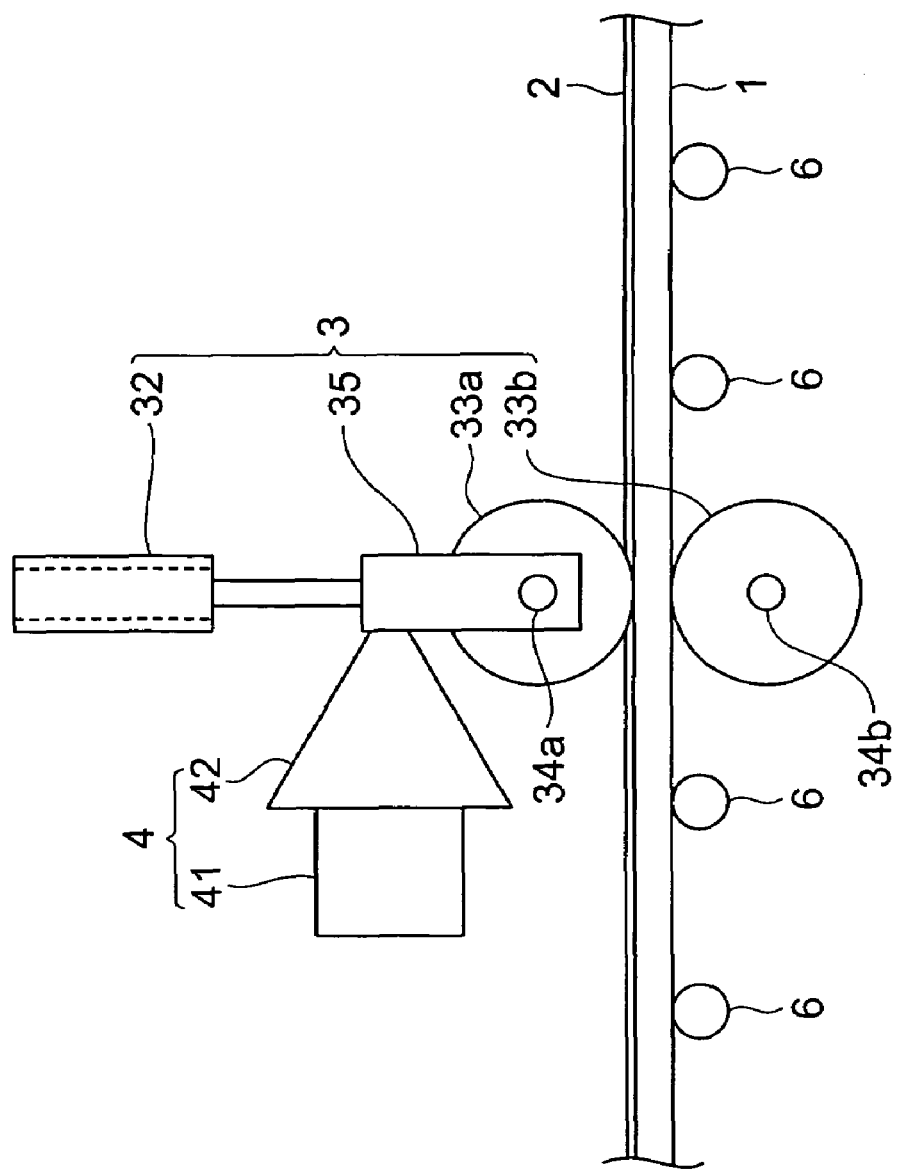
FIG. 4 is a schematic constitutional diagram illustrating a film lamination apparatus according to a fourth embodiment of the present invention.

FIG. 4 is a schematic constitutional diagram illustrating a film lamination apparatus according to a fourth embodiment of the present invention. In the apparatus illustrated in FIG. 4, opposing pressure rollers 33a, 33b are provided as pressurizing members, these pressure rollers 33a, 33b being rotatable about respective rotation shafts 34a, 34b. Sound waves generated by the oscillator 41 and condensed by the horn 42 are applied to a holder 35 for supporting the pressure roller 33a (rotation shaft 34a). This apparatus is further provided with a plurality of transport rollers 6 which are capable of transporting the laminated substrate 1 and film 2 between the pressure rollers 33a, 33b.

In the fourth embodiment, the substrate 1 and the film 2 disposed on the substrate 1 are transported between the pressure rollers 33a, 33b by the transport rollers 6, whereupon the pressure roller 33a is pushed downward by the air cylinder 32 such that pressure is applied to the substrate 1 and film 2 in the direction of thickness. Sound waves from the sound wave generator 4 are transmitted through the holder 35 and the pressure roller 33a to the film 2 at this time, whereby the adhesion of the film 1 to the substrate 1 and the quality of covering irregularities are enhanced by the synergistic effect of the pressurization and the acoustic vibration energy action.

Further, by using the pressure rollers 33a, 33b and the transport rollers 6 in this manner, the pressure from the air cylinder 32 and the sound waves from the sound wave generator 4 are transmitted uniformly in the region which is perpendicular to the direction of movement of the film 2 between the pressure rollers. Also, since this lamination process is performed successively, lamination efficiency can be even further enhanced.

Figure 5:
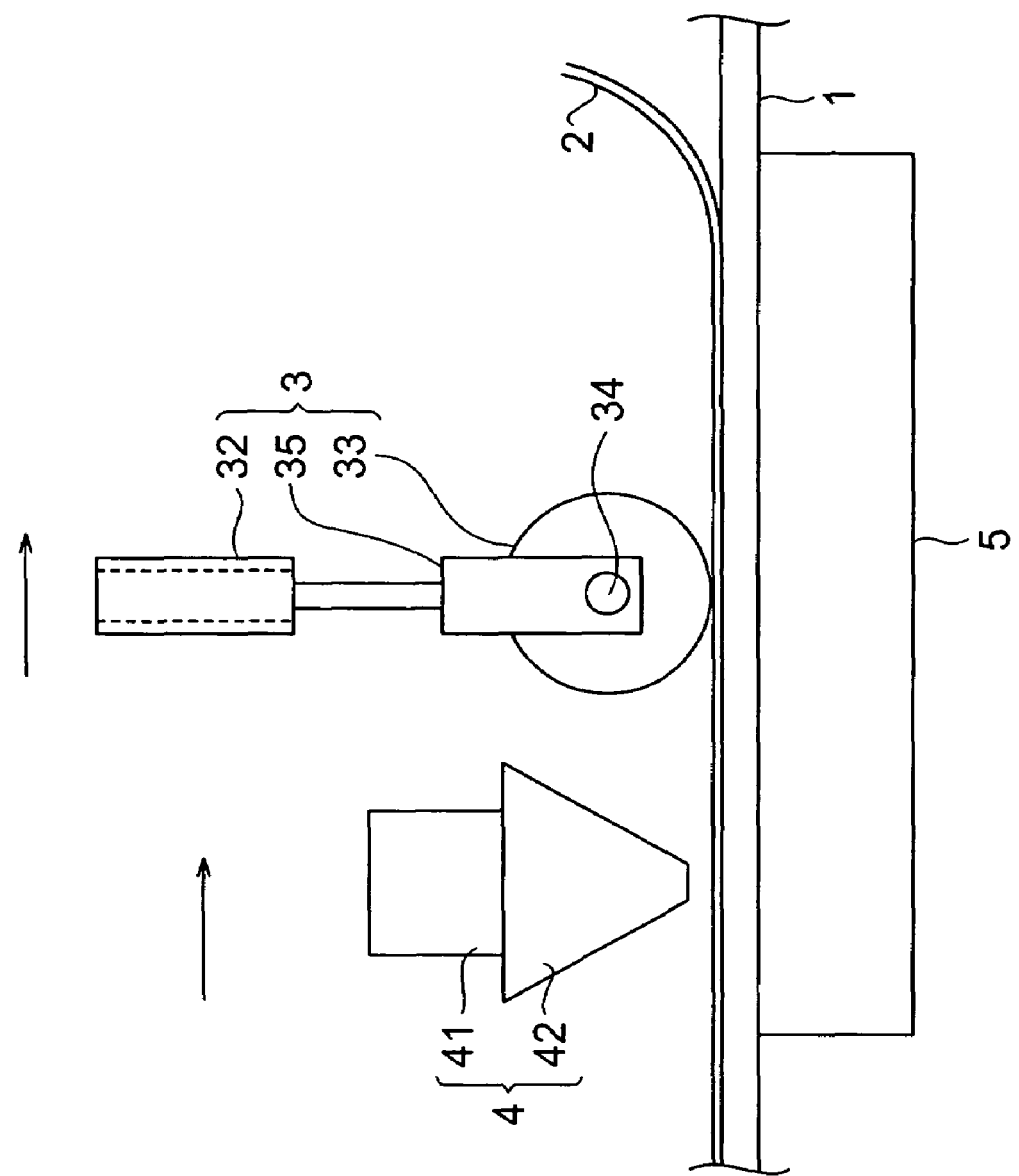
FIG. 5 is a schematic constitutional diagram illustrating a film lamination apparatus according to a fifth embodiment of the present invention.

FIG. 5 is a schematic constitutional diagram illustrating a film lamination apparatus according to a fifth embodiment of the present invention. In the apparatus illustrated in FIG. 5, a pressurization device 3 and a sound wave generator 4 are provided on the upper surface side of a support base 5 which supports the substrate 1 and film 2. The pressurization device 3 is provided with a pressure roller 33 which is disposed facing the upper surface of the support base 5, and the pressure roller 33 may be rotated by means of the rotation shaft 34 thereof being supported by a holder 35. The sound wave generator 4 is constituted in a similar manner to the aforementioned embodiments, comprising an oscillator 41 and a horn 42. The pressurization device 3 and sound wave generator 4 are movable in a predetermined direction (for example the direction of the arrows in the drawing) along the upper surface of the support base 5.

In the fifth embodiment, the film 1 is disposed on the substrate 1, whereupon the substrate 1 and film 2 are pressurized in the direction of thickness by the pressurization device 3 and sound waves are then applied by the sound wave generator 4. When the sound wave application process is conducted after the pressurizing process in this manner, the adhesion and the quality of covering irregularities between the substrate 1 and film 2 are enhanced by the synergistic effect of the pressurization and the acoustic vibration energy action.

Figure 6:
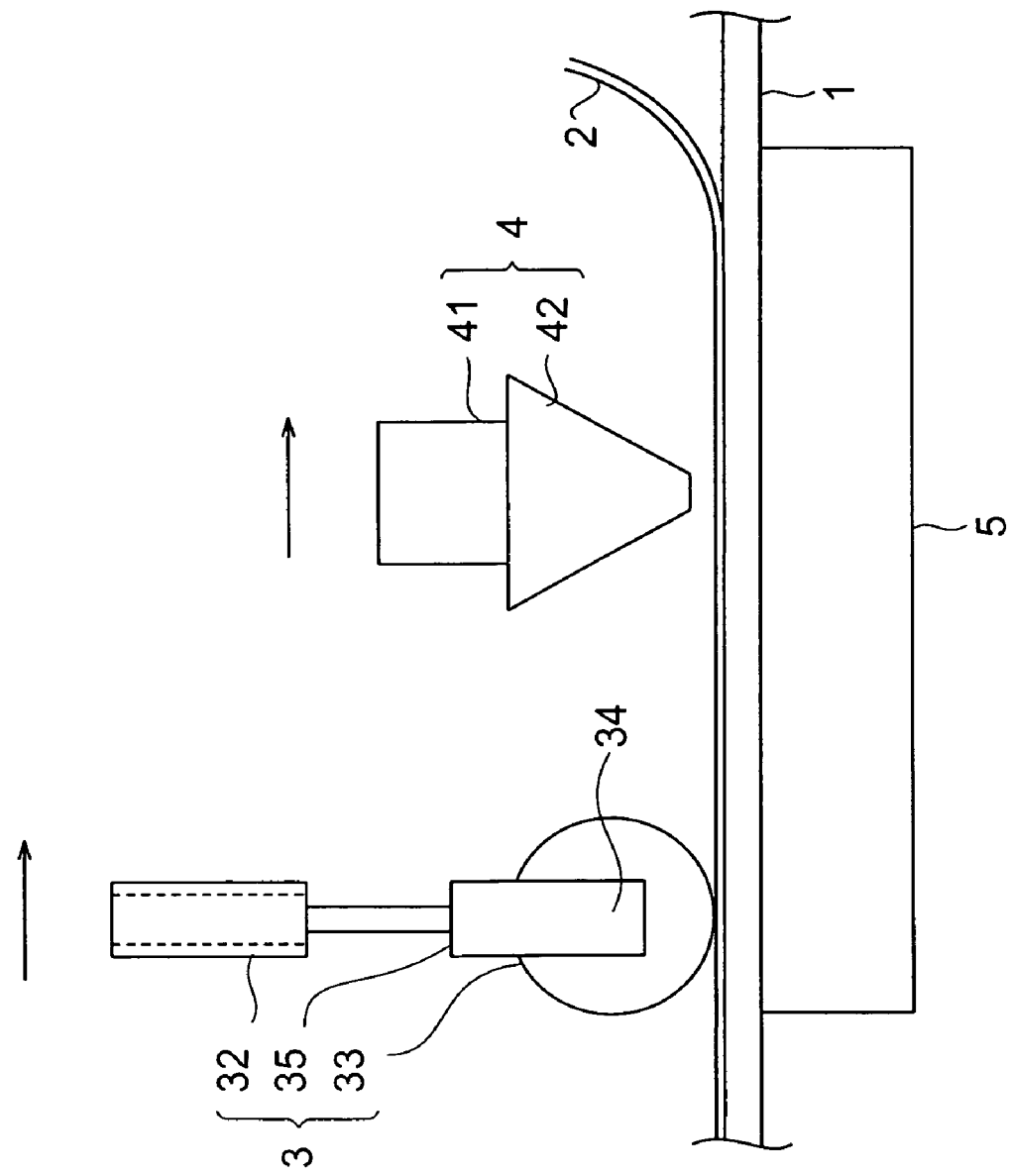
FIG. 6 is a schematic constitutional diagram illustrating a film lamination apparatus according to a sixth embodiment of the present invention.

FIG. 6 is a schematic constitutional diagram illustrating a film lamination apparatus according to a sixth embodiment of the present invention. The apparatus illustrated in FIG. 6 has a similar constitution to the apparatus illustrated in FIG. 5, differing merely in that the disposition of the pressurization device 3 and sound wave generator 4 is opposite in respect of the movement directions thereof.

In the sixth embodiment, the film 2 is disposed on the substrate 1, whereupon sound waves from the sound wave generator 4 are applied and the substrate 1 and film 2 are then pressurized in the direction of thickness by the pressurization device 3. When the sound wave application process is conducted prior to the pressurizing process in this manner, the adhesion and the quality of covering irregularities between the substrate 1 and film 2 are enhanced by the synergistic effect of the pressurization and the acoustic vibration energy action.

Note that the present invention is not limited to or by these embodiments. For example, in all of the apparatus illustrated in FIGS. 1 through 6, lamination of the film 2 to the substrate 1 is performed by applying sound waves to the film 2, but sound waves may be applied to the substrate 1 or sound waves may be applied to both the substrate 1 and the film 2. Moreover, when sound waves are applied to the substrate 1, the sound wave generator for applying sound waves may be provided separately on the support base 5 such that sound waves can be applied to the substrate 1 via the support base 5.

Further, in any of the aforementioned embodiments the support base 5 may be replaced by the transport rollers 6, or the support base 5 may be used in place of the transport rollers 6.

EXAMPLES

The present invention will now be described more specifically on the basis of examples and comparative examples. However, the present invention is not limited whatsoever to or by the following examples.

Example 1

Using an apparatus constituted as that shown in FIG. 2, a photosensitive film (product name: "Photec" RY-3025, manufactured by Hitachi Chemical Co., Ltd.) was laminated onto a copper clad laminate (product name: MCL-E-679, manufactured by Hitachi Chemical Co., Ltd.) having flaws with depths from 5 μm to 9 μm on copper foil. More specifically, the copper clad laminate and the photosensitive resin composition layer of the photosensitive film were bonded together at a heat of 23° C. and sound waves with a frequency of 28 kHz were applied while applying pressure of 0.4 MPa in the direction of thickness to thereby obtain a laminate body.

The embedding quality of the film into the flaws on the copper clad laminate in the obtained laminate body was evaluated on the basis of the following criteria:

A: The film is sufficiently embedded into all of the 5 μm to 9 μm flaws.

B: The film is embedded in flaws from 5 μm to 7 μm.

C: The film is embedded in 5 μm flaws or not embedded at all.

The obtained evaluation results are shown in Table 1.

Example 2

The photosensitive film was laminated onto the copper clad laminate in an identical fashion to Example 1 except for the fact that the frequency of the sound waves was set at 40 kHz, and the embedding quality was evaluated. The obtained evaluation results are shown in Table 1.

Example 3

The photosensitive film was laminated onto the copper clad laminate in an identical fashion to Example 1 except for the fact that the frequency of the sound waves was set at 10 kHz, and the embedding quality was evaluated. The obtained evaluation results are shown in Table 1.

Comparative Example 1

Using a high temperature/normal pressure laminator, the same copper clad laminate and photosensitive film as in Example 1 were bonded together and a laminate body was obtained by applying pressure of 0.4 MPa in the direction of thickness while heating the film to 110° C.

The same evaluation of embedding quality as in Example 1 was performed in respect of the obtained laminate body. The obtained evaluation results are shown in Table 1.

Comparative Example 2

Using a vibration laminator (manufactured by Taisei Laminator K.K.), the same copper clad laminate and photosensitive film as in Example 1 were bonded together and a laminate body was obtained by applying vibrations at 25,000 c/min to the film while applying pressure of 0.4 MPa in the direction of thickness. This lamination process was performed at 23° C.

The same evaluation of embedding quality as in Example 1 was performed in respect of the obtained laminate body. The obtained evaluation results are shown in Table 1.

Comparative Example 3

Apart from the film being heated to 110° C., lamination of the copper clad laminate and photosensitive film was performed in an identical manner to Comparative Example 2.

The same evaluation of embedding quality as in Example 1 was performed in respect of the obtained laminate body. The obtained evaluation results are shown in Table 1.

TABLE 1

| | FREQUENCY OR VIBRATION FREQUENCY | TEMPERATURE | PRESSURE | EMBEDDED QUALITY |
|---|---|---|---|---|
| EXAMPLE 1 | 28 kHz | 23° C. | 0.4 MPa | A |
| EXAMPLE 2 | 40 kHz | 23° C. | 0.4 Mpa | A |
| EXAMPLE 3 | 10 kHz | 23° C. | 0.4 Mpa | B |
| COMPARATIVE EXAMPLE 1 | — | 110° C. | 0.4 Mpa | C |
| COMPARATIVE EXAMPLE 2 | 25,000 c/min | 23° C. | 0.4 Mpa | C |
| COMPARATIVE EXAMPLE 3 | 25,000 c/min | 110° C. | 0.4 MPa | C |

Example 4

Figure 7:
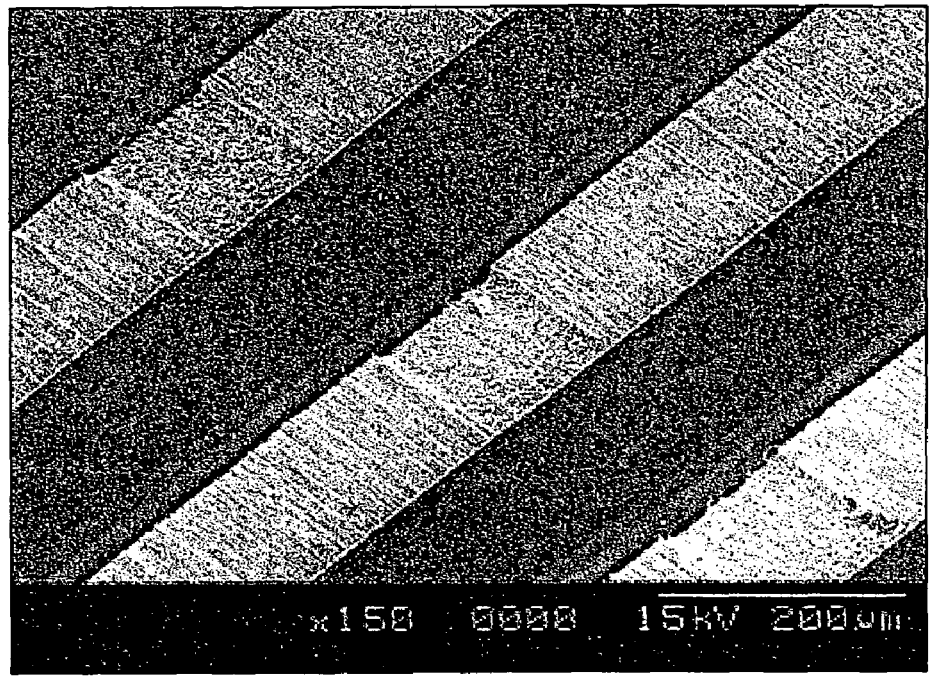
FIG. 7 is an electron microscope photograph of a laminated body obtained in a fourth example.

Using the apparatus having the constitution illustrated in FIG. 2, a photosensitive film (product name: H-W425, manufactured by Hitachi Chemical Co., Ltd., fluidity: 140 μm) was laminated onto a copper clad laminate with a flaw of 7 μm depth and 100 μm width in copper foil having a thickness of 18 μm. More specifically, the copper clad laminate and the photosensitive resin composition layer of the photosensitive film were bonded together at a heat of 23° C. and sound waves with a frequency of 20 kHz were applied while applying pressure or 0.4 MPa in the direction of thickness to thereby obtain a laminate body. The laminating temperature at this time was 80° C. and the lamination rate was 1.5 m/minute. Further, the substrate was preheated upon lamination of the copper clad laminate and the photosensitive film. An electron microscope photograph (magnified 1,500,000 times, same throughout) of the obtained laminate body is shown in FIG. 7.

Example 5

Figure 8:
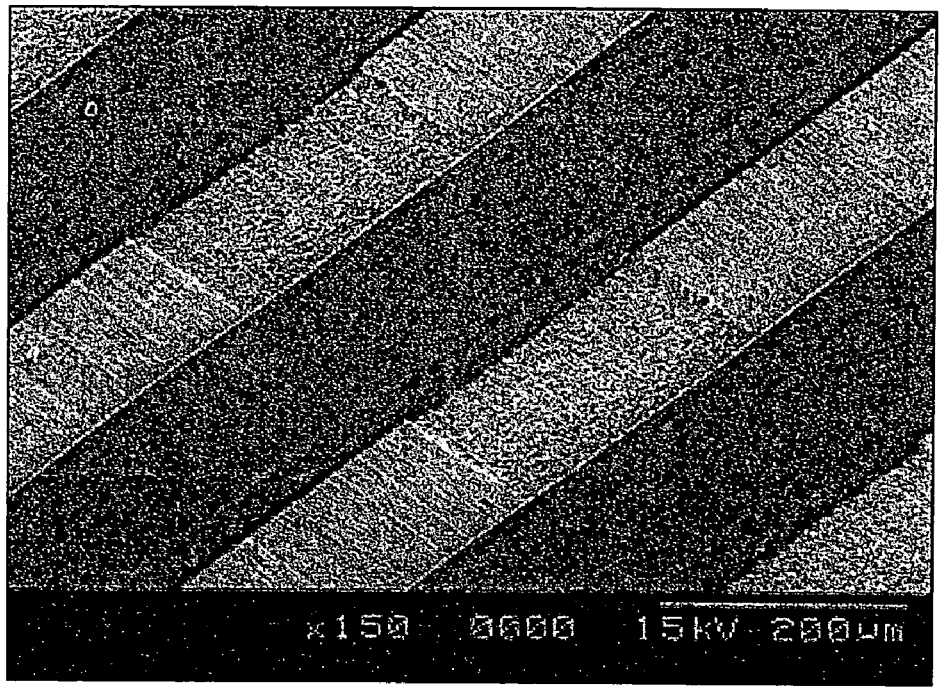
FIG. 8 is an electron microscope photograph of a laminated body obtained in a fifth example.

Apart from setting the width of the flaw in the copper foil to 200 μm, lamination of the photosensitive film onto the copper clad laminate was performed in an identical manner to Example 4. An electron microscope photograph of the obtained laminate body is shown in FIG. 8.

Example 6

Figure 9:
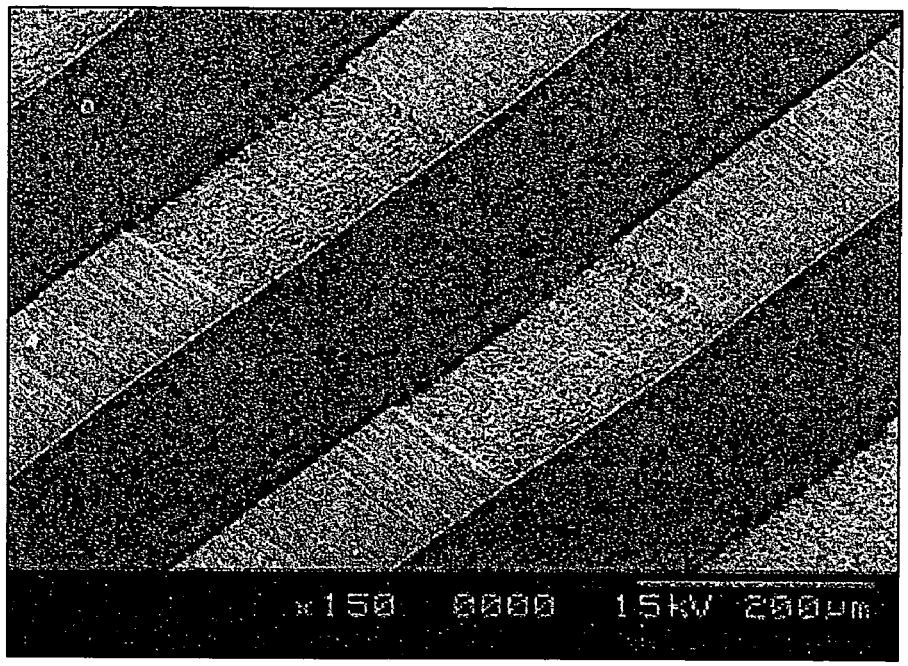
FIG. 9 is an electron microscope photograph of a laminated body obtained in a sixth example.

Apart from setting the width of the flaw in the copper foil to 400 μm, lamination of the photosensitive film onto the copper clad laminate was performed in an identical manner to Example 4. An electron microscope photograph of the obtained laminate body is shown in FIG. 9.

Example 7

Figure 10:
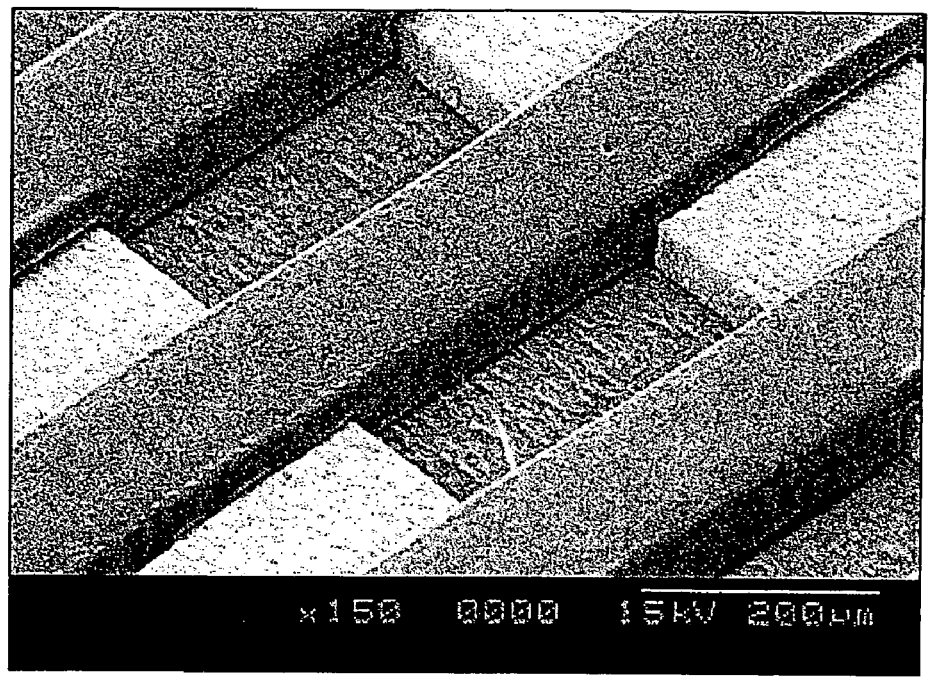
FIG. 10 is an electron microscope photograph of a laminated body obtained in a seventh example.

Apart from setting the width of the flaw in the copper foil to 300 μm and using FR-5025 (manufactured by Hitachi Chemical Co., Ltd.) as the photosensitive film, lamination of the photosensitive film onto the copper clad laminate was performed in an identical manner to Example 4. An electron microscope photograph of the obtained laminate body is shown in FIG. 10.

Example 8

Figure 11:
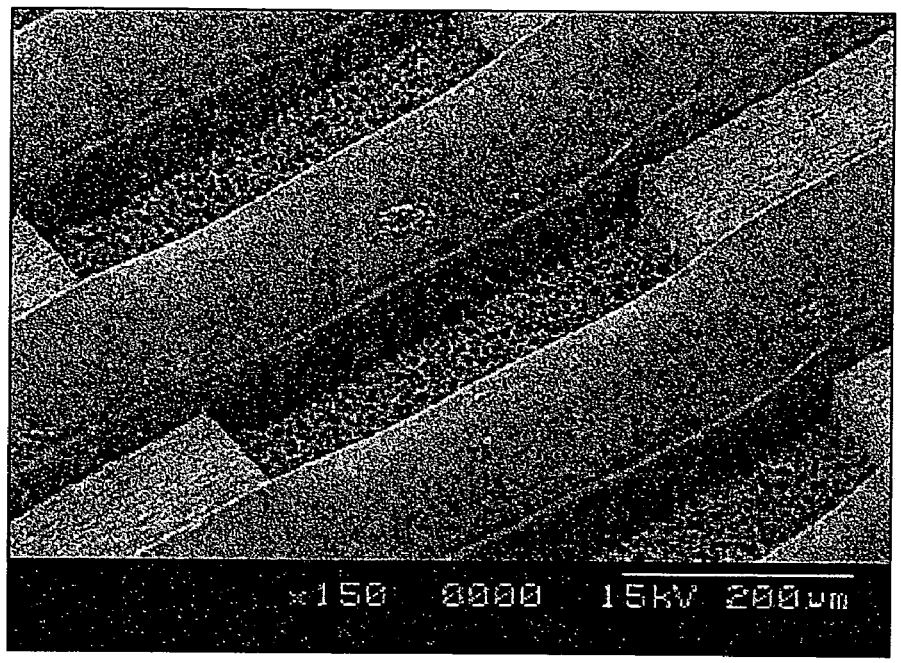
FIG. 11 is an electron microscope photograph of a laminated body obtained in an eighth example.

Apart from setting the thickness of the copper foil to 35 μm and the width of the flaw to 400 μm, lamination of the photosensitive film onto the copper clad laminate and was performed in an identical manner to Example 7. An electron microscope photograph of the obtained laminate body is shown in FIG. 11.

Comparative Example 4

Figure 12:
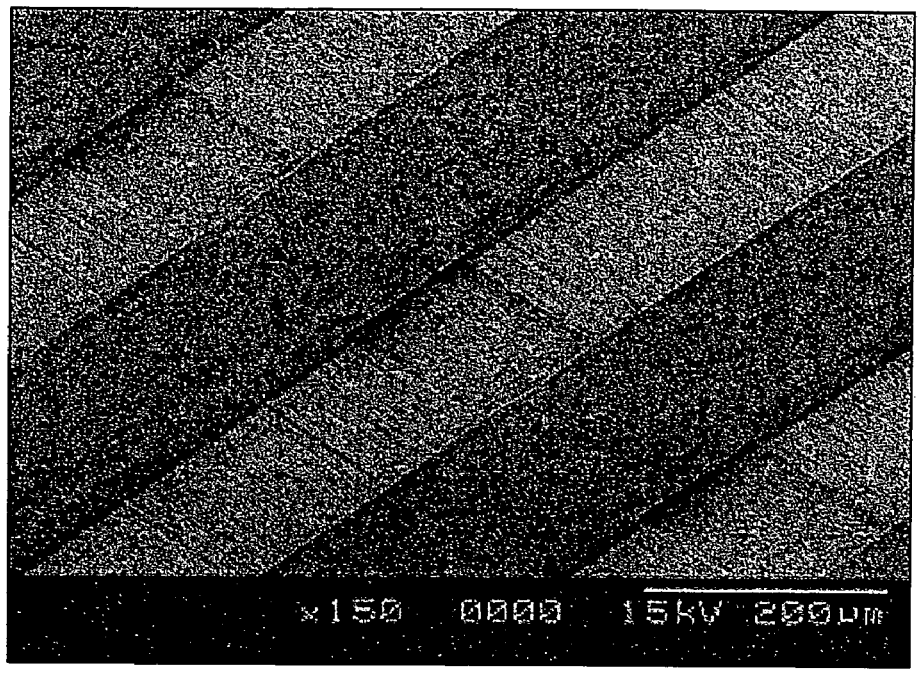
FIG. 12 is an electron microscope photograph of a laminated body obtained in a fourth comparative example.

Apart from not performing sound wave application, lamination of the photosensitive film onto the copper clad laminate was performed in an identical manner to Example 4. An electron microscope photograph of the obtained laminate body is shown in FIG. 12.

Comparative Example 5

Figure 13:
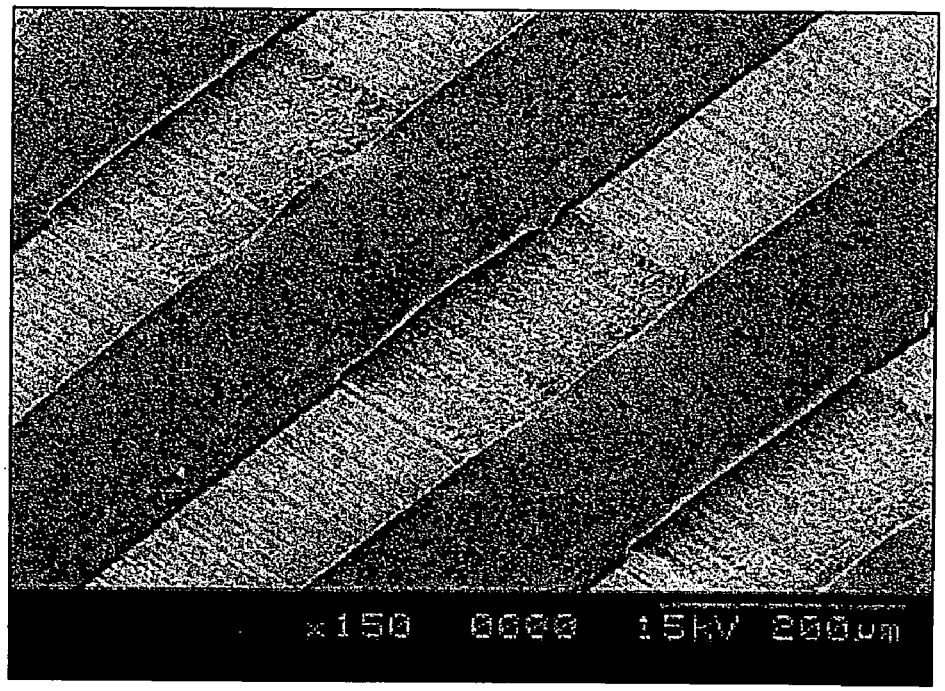
FIG. 13 is an electron microscope photograph of a laminated body obtained in a fifth comparative example.

Apart from not performing sound wave application, lamination of the photosensitive film onto the copper clad laminate was performed in an identical manner to Example 5. An electron microscope photograph of the obtained laminate body is shown in FIG. 13.

Comparative Example 6

Figure 14:
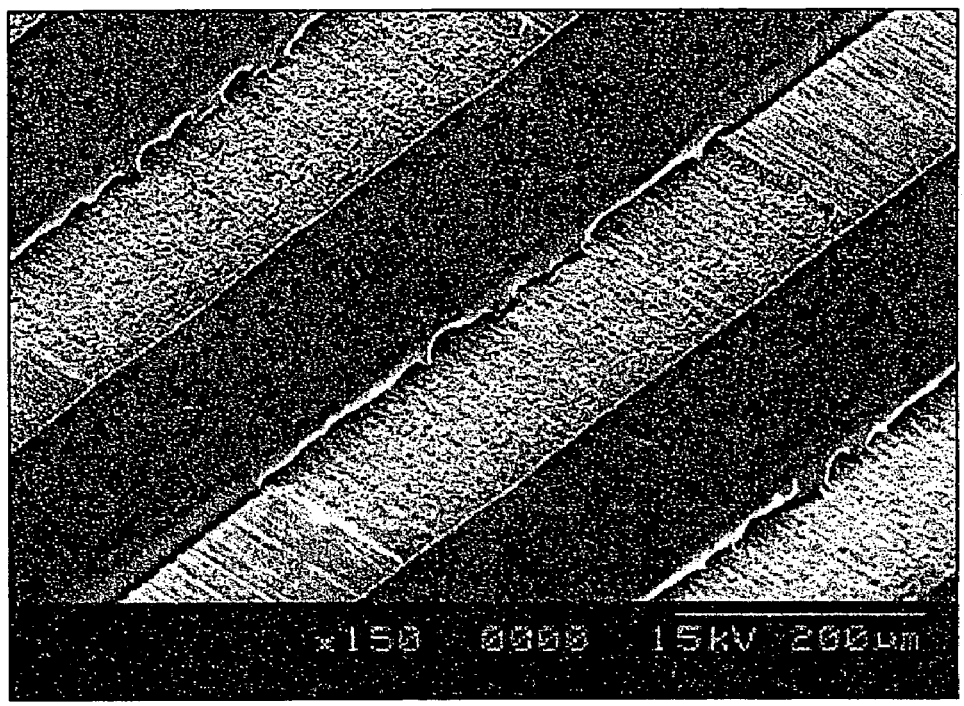
FIG. 14 is an electron microscope photograph of a laminated body obtained in a sixth comparative example.

Apart from not performing sound wave application, lamination of the photosensitive film onto the copper clad laminate was performed in an identical manner to Example 6. An electron microscope photograph of the obtained laminate body is shown in FIG. 14.

As is illustrated in FIGS. 7 through 11, the embedding quality of the film into the flaws in Examples 4 through 8 was confirmed as being favorable. As is illustrated in FIGS. 12 through 14, on the other hand, in the cases of Comparative Examples 4 through 6, gaps occur between the copper clad laminate and the film, surface irregularities occur in the embedded parts of the film, and hence a sufficient embedding quality was not obtained.

INDUSTRIAL APPLICABILITY

According to the film lamination method and apparatus of the present invention as described above, by applying sound waves with a predetermined frequency to at least one of a substrate or a film when the film is laminated on the substrate, the adhesion of the film to the substrate and the quality of covering irregularities can be sufficiently enhanced by the acoustic vibration energy action and a high standard of embedding can be achieved.

The invention claimed is:

1. A film lamination method comprising the steps of:
   providing a printed board comprising a conductive metal layer with irregularities formed in said conductive metal layer; and
   applying, upon lamination of a film on said printed board, pressure of 0.1-1 MPa in the direction of thickness of said film disposed on said printed board and sound waves with a predetermined frequency to at least one of said printed board or said film, wherein said film comprises a first layer consisting of a photosensitive resin composition, and wherein the photosensitive resin composition comprises a resin and a photopolymerized compound having at least one intramolecular polymerizable ethylene unsaturated bond, and wherein said film is laminated on said printed board so that said first layer and said conductive metal layer are bonded together along the irregularities formed in said conductive metal layer such that the film is embedded into the irregularities formed in the conductive metal layer.

2. The film lamination method according to claim 1, further comprising the steps of:
   a pressurization step in which said film is disposed on said printed board and pressure is applied in the direction of thickness; and
   a sound wave application step in which sound waves with a predetermined frequency are applied to at least one of said printed board or said film following said pressurization step.

3. The film lamination method according to claim 1, further comprising the steps of:
   a sound wave application step in which said film is disposed on said printed board and sound waves with a predetermined frequency are applied to at least one of said printed board or said film; and
   a pressurization step in which pressure is applied in the direction of thickness following said sound wave application step.

4. The film lamination method according to claim 1, wherein the frequency of said sound waves is not less than 16 kHz.

5. The film lamination method according to claim 1, further comprising the steps of:
   disposing said film on said printed board and applying pressure in the direction of thickness of said film; and
   following film disposition and application of pressure, applying the sound waves with a predetermined frequency to at least one of said printed board or said film.

6. The film lamination method according to claim 1, further comprising the steps of:
   disposing said film on said printed board and applying said sound waves of a predetermined frequency to at least one of said printed board or said film; and
   following film disposition and application of said sound waves, applying pressure in the direction of thickness of said film.

7. The film lamination method according to claim 5, wherein said acoustic vibration energy enhances covering of irregularities formed in said substrate without heating.

8. A laminated body obtained by laminating a film to a substrate, wherein the laminated body is obtained using a film lamination method according to claim 1.

9. A film lamination method according to claim 1, wherein the printed hoard further comprises a substrate comprising the conductive metal layer; and applying, upon lamination of the film on said substrate, the pressure of 0.1-1 MPa in the direction of thickness of said film disposed on said substrate and sound waves with the predetermined frequency to at least one of said substrate or said film, wherein acoustic vibration energy of said sound waves enhances adhesion of said film to said substrate without heating.

* * * * *